US008403645B2

(12) United States Patent
Barnes et al.

(10) Patent No.: US 8,403,645 B2
(45) Date of Patent: Mar. 26, 2013

(54) TURBOFAN FLOW PATH TRENCHES

(75) Inventors: Roland R. Barnes, Bloomfield, CT (US); Cagdas Yilmaz, Moodus, CT (US)

(73) Assignee: United Technologies Corporation, Hartford, CT (US)

( * ) Notice: Subject to any disclaimer, the term of this patent is extended or adjusted under 35 U.S.C. 154(b) by 704 days.

(21) Appl. No.: 12/560,710

(22) Filed: Sep. 16, 2009

(65) Prior Publication Data
US 2011/0064580 A1     Mar. 17, 2011

(51) Int. Cl.
*F01D 5/14* (2006.01)
(52) U.S. Cl. ....................................................... 416/234
(58) Field of Classification Search .................. 416/234, 416/235, 236 R, 193 A, 193 R, 248
See application file for complete search history.

(56) References Cited

U.S. PATENT DOCUMENTS

| 3,781,125 A | 12/1973 | Rahaim et al. |
| 4,536,932 A | 8/1985 | Athey |
| 5,071,313 A | 12/1991 | Nichols |
| 5,213,475 A | 5/1993 | Peterson et al. |
| 5,556,257 A | 9/1996 | Foster et al. |
| 5,993,162 A | 11/1999 | Weisse et al. |
| 6,213,711 B1 * | 4/2001 | Muller et al. .................. 415/191 |
| 6,471,483 B2 | 10/2002 | London |
| 6,478,545 B2 | 11/2002 | Crall et al. |
| 6,524,070 B1 * | 2/2003 | Carter ........................ 416/193 A |
| 7,097,422 B2 | 8/2006 | Rice et al. |
| 7,445,433 B2 | 11/2008 | Chivers et al. |

* cited by examiner

Primary Examiner — Ninh H Nguyen
Assistant Examiner — Adam W Brown
(74) Attorney, Agent, or Firm — Kinney & Lange, P.A.

(57) ABSTRACT

An integrally bladed disk includes a rim and blades. The blades are circumferentially spaced and extend integrally outward from the rim to define a flow path therebetween. The periphery of the rim forms a flow surface and includes a trench that is disposed adjacent the blades.

18 Claims, 10 Drawing Sheets

US 8,403,645 B2

TURBOFAN FLOW PATH TRENCHES

BACKGROUND

The present invention relates to gas turbine engines, and more particularly, to integrally bladed disks in gas turbine engines.

The fan, turbine and compressor sections of gas turbine engines include one or more circumferentially extending rows or stages of airfoils, commonly called rotor blades, which are axially spaced between rows or stages of fixed airfoils (stator vanes). The rotor blades are connected to and extend radially outwardly from a rotor disk. During operation the centrifugal loads generated by the rotational action of the rotor blades must be carried by the rotor disk within acceptable stress limits.

Conventional rotor blades are carried in the rotor disk by a dovetail or fir tree root which slides into and interlocks with a corresponding dovetail slot in the perimeter of the rotor disk. However, as the number of rotor blades around the perimeter of the disk increases, insufficient material is available for supporting the plurality of rotor blades within acceptable stress limits. Accordingly, integrally bladed disks have been developed and are commercially used. Integrally bladed disks do not utilize the interlocked dovetail design but instead are integrally joined to the rotor blades as a single-piece, unitary assembly by milling, forging, casting or other known manufacturing operations.

Integrally bladed disks can be used to increase aerodynamic efficiency of the gas turbine engine while reducing the stresses associated with supporting the rotor blades. One of the stresses associated with supporting the rotor blades is a hoop stress. The hoop stress is defined as a load measured in the direction of the circumference of a rotating body, the load being created by thermal gradients and centrifugal forces acting in a radial direct outwardly from the axis of rotation of the body. The hoop stress is particularly acute where the gas turbine engine utilizes integrally blades disks. Integrally bladed disks have been known to develop fractures along their perimeter during operation due to the hoop stress and principle stresses. These fractures necessitate replacement of the integrally bladed disks to avoid a catastrophic failure.

SUMMARY

An integrally bladed disk includes a rim and blades. The blades are circumferentially spaced and extend integrally outward from the rim to define a flow path therebetween. The periphery of the rim forms a flow surface and includes a trench that is disposed adjacent the blades.

DETAILED DESCRIPTION

Figure 1:
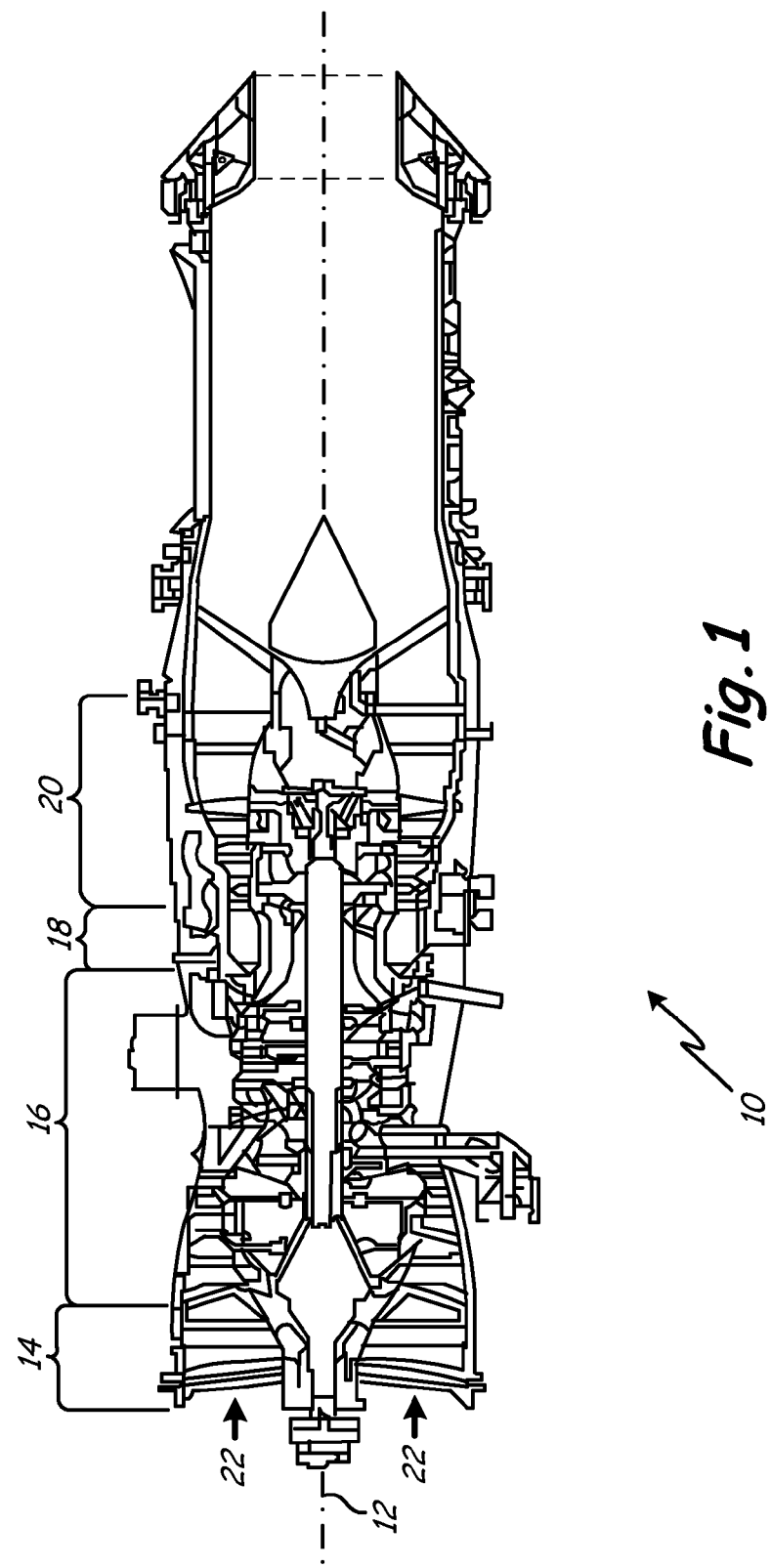
FIG. 1 is a schematic sectional view of one embodiment of an aircraft turbofan engine.

FIG. 1 shows an axial cross-section of gas turbine engine 10 including an engine axis 12, a fan 14, a compressor 16, a combustor 18, and a turbine 20. The fan 14 includes a casing that surrounds a rotor to which the blades of the fan are attached. An air stream 22 is pulled into the front of engine 10 by the rotation of the fan 14 blades about the engine axis 12. The fan 14 directs a portion of the air stream 22 into the compressor 16. The air stream 22 is successively compressed through stages of airfoils in the compressor 16 and is directed into the combustor 18. The air stream 22 is mixed with fuel and ignited in combustor section 18 and is then directed into the turbine 20 where the mixture is successively expanded through alternating stages of airfoils comprising turbine rotor blades and stator vanes. A portion of the gas and fuel mixture leaving the combustor 18 acts to rotate turbine 20, which powers the fan 14 and the compressor 16. The remaining portion of the gas and fuel mixture passing through the turbine 20 exits the back of the engine 10 to provide thrust for the engine 10. Operating criteria such as the desired size, weight and thrust capacity of the gas turbine engine 10 and the acceptable stress limits due to centrifugal loads and thermal stresses experienced in some sections or stages of engine 10 can necessitate that the rotor blades be integrally bladed to rotor disks.

Figure 2A:
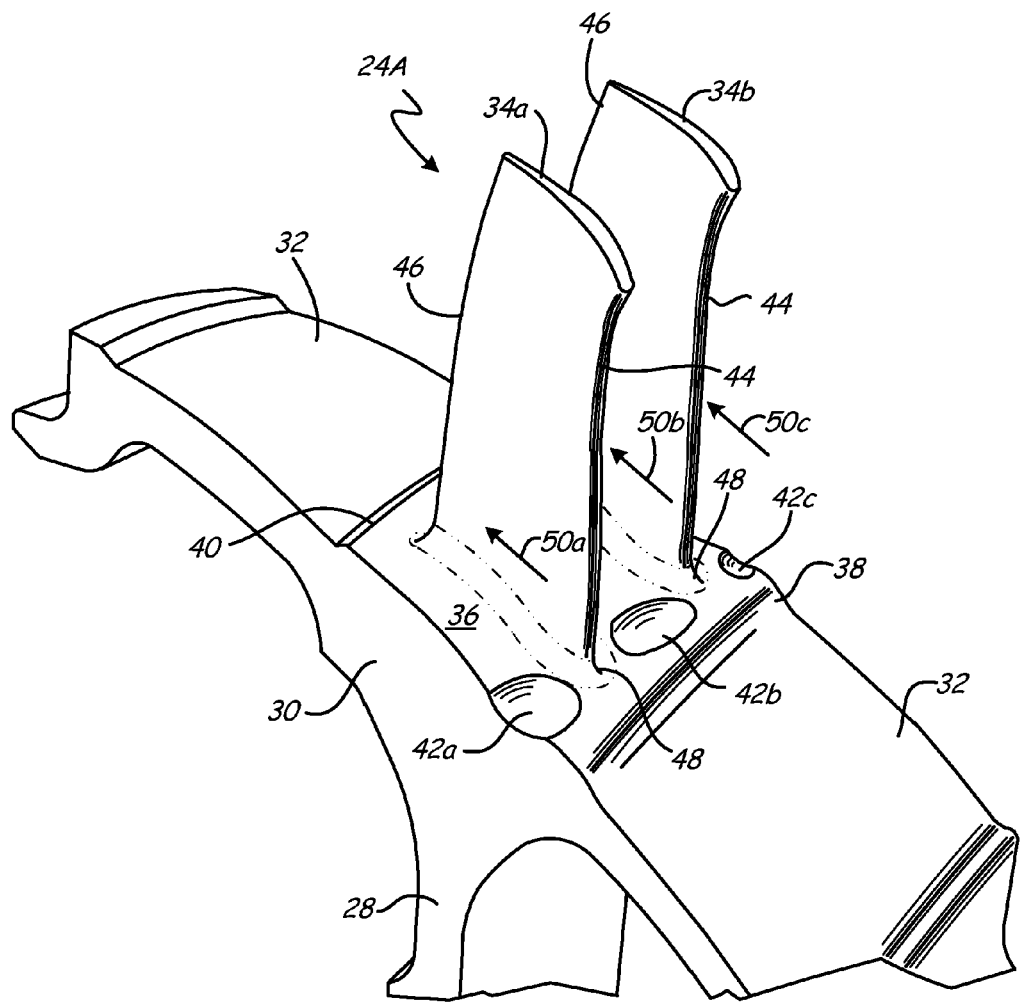
FIG. 2A is a perspective view of a circumferential section of one embodiment of an integrally bladed rotor disk having flow path trenches in the perimeter thereof.
Figure 2B:
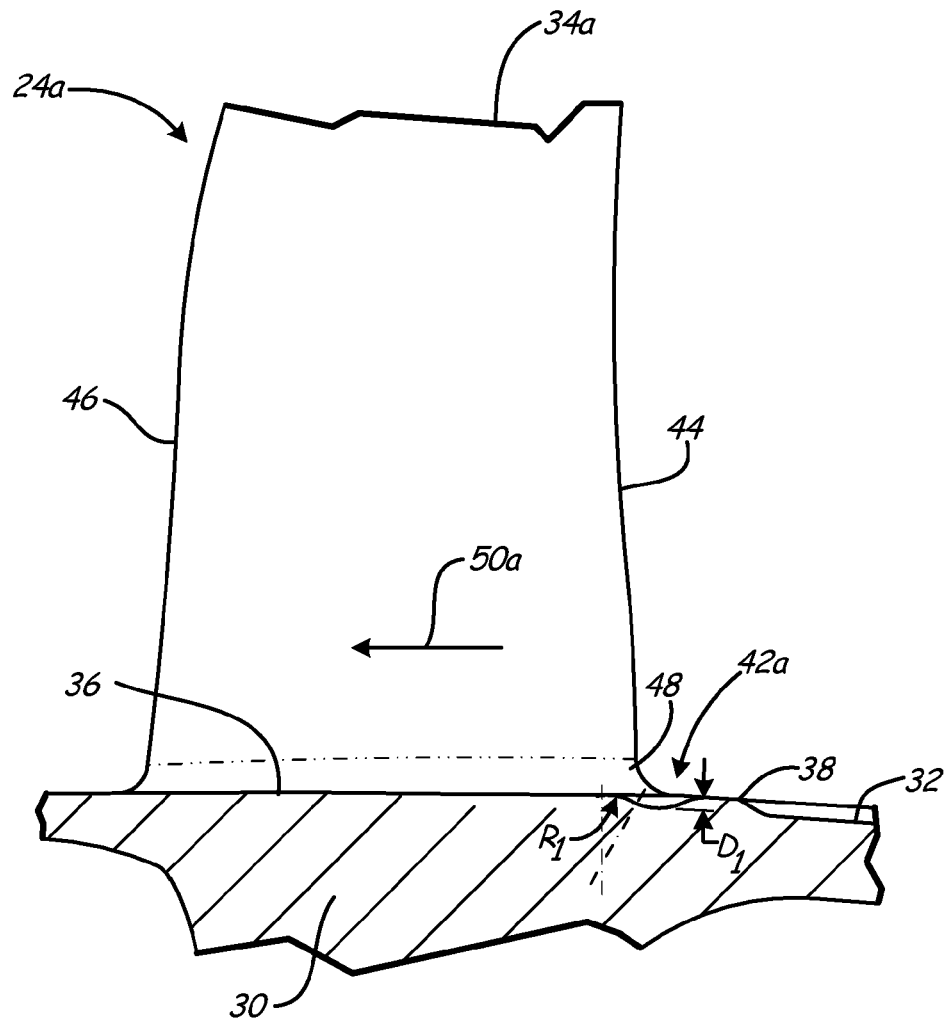
FIG. 2B is a radial sectional view of the integrally bladed rotor disk illustrated in FIG. 2A.
Figure 2C:
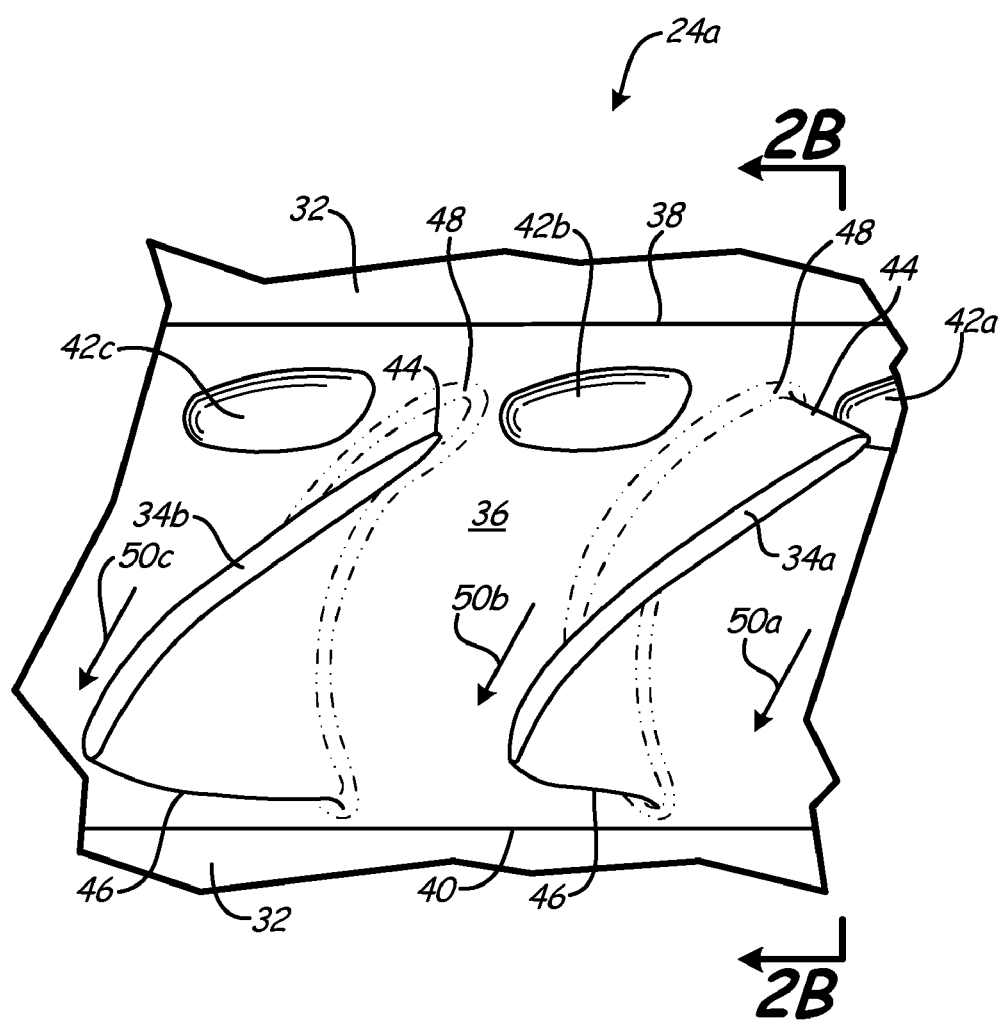
FIG. 2C is a top perspective view of the perimeter of the integrally bladed rotor disk illustrated in FIG. 2A.

FIGS. 2A-2C are views from various perspectives of a circumferential portion of one embodiment of an integrally bladed disk 24A. The integrally bladed disk 24A is connected to the rotor in one or more of the various stages of the engine 10 (FIG. 1), including the fan 14, compressor 16, and/or turbine 20. The integrally bladed disk 24A includes a hub (not shown), a web 28, a rim 30, arms 32 and rotor blades or airfoils 34a and 34b. The rim 30 includes a flow surface 36, a leading edge 38, a trailing edge 40, and trenches or dimples 42a, 42b, and 42c. Each rotor blade 34a and 34b includes a leading edge 44, a trailing edge 46 and a fillet 48.

FIG. 2A shows the integrally bladed disk 24A and illustrates the radially innermost hub (not shown) (innermost relative to the engine axis 12 shown in FIG. 1) which is connected to the rim 30 by the web 28. The arms 32 extend axially forward and aft (as defined by the flow direction of a working fluid moving relative to engine axis 12 and passing across the integrally bladed disk 24A) of the rim 30. The rotor blades 34a and 34b comprise a portion of a row of blades (not shown) and extend generally radially outwardly of the rim 30 in a unitary or single-piece manner. The flow surface 36 comprises the radial outer periphery of the rim 30 adjacent the rotor blades 34a and 34b. The flow surface 36 extends axially from the leading edge 38 to the trailing edge 40 as defined by the flow direction of a working fluid passing across the flow surface 36. The flow surface 36 also extends circumferentially between the rotor blades 34a and 34b. The trenches 42a, 42b, and 42c illustrated in FIGS. 2A-2C, are disposed circumferentially adjacent each of the rotor blades in the row of rotor blades. The trench 42b is disposed circumferentially adjacent both the rotor blades 34a and 34b. As will be discussed in further detail subsequently, the geometry of the trenches and location of the trenches can be modified in various embodiments of the integrally bladed disk to achieve a desired reduction in the hoop and principle stresses incurred on the integrally bladed disk during operation. The location and geometry of the trenches can be optimized to design criteria using commercially available finite element analysis and computational fluid dynamics software such as software retailed by ANSYS, Inc. of Canonsburg, Pa.

Each rotor blade 34a and 34b is integrally connected to the rim 30 and has a conventional aerodynamic configuration with a generally concave pressure side and generally convex suction side for pressurizing the working fluid during operation. The rotor blades 34a and 34b extend from the leading edge 44 to the trailing edge 46. The fillet 48 aerodynamically transitions the root or base portion of each rotor blade 34a and 34 from the flow surface 36 of the rim 30. Each rotor blade 34a and 34b defines, along with the blades disposed circumferentially adjacent to it (not shown), flow paths 50a, 50b and 50c through which the working fluid is channeled during operation. The radially inward part of the flow paths 50a, 50b, and 50c is defined by the flow surface 36 and trenches 42a, 42b, and 42c.

The geometry of the trenches 42a, 42b, and 42c can vary depending on criteria such as the application of the integrally bladed disk 24A within the engine 10 (FIG. 1) and the desired and acceptable stress tolerances. The trenches 42a, 42b, and 42c shown in FIGS. 2A-2C, are depressions in the rim 30 along the flow surface 36 where air (working fluid) flowing along the integrally bladed disk 24A makes a transition in flow direction. More generally, for the purpose of this application, "trench" or "depression" means a feature that causes a discontinuity in the hoop direction of an integrally bladed disk. As shown in FIGS. 2B and 2C, the trenches 42a, 42b, and 42c are disposed axially aft (as defined by the flow direction of a working fluid moving relative to the engine axis 12 and passing across the integrally bladed disk 24A) of the leading edge 38 of the flow surface 36 but extend axially forward and rearward of the leading edges 44 of the rotor blades 34a and 34b. In particular, the deepest point of trenches 42a, 42b, 42c are disposed to circumferentially align with a location of highest stress concentration (a life limiting location) at a leading edge of the fillet 48 of each rotor blade 34a and 34b.

In the embodiment illustrated in FIG. 2B the trench 42a has a depth $D_1$ of between about 0.005 inch (0.127 mm) and 0.060 inch (1.52 mm). Preferably, the depth $D_1$ is between about 0.010 inch (0.254 mm) and about 0.025 inch (0.635 mm). The radius $R_1$ of the trenches 42a, 42b, and 42c can vary because, for example, the diameter of the head of the milling tool can vary. In the embodiment shown in FIG. 2B, trench 42a has a faired out radius $R_1$ (a radius that has a smooth transition from a deepest point of the trench 42a to the flow surface 36 and/or the radius of fillet 48) into the flow path 50a of about 0.10 inch (2.54 mm) forward and aft of the trench 42a. The distance the rotor blades 34a and 34b are circumferentially spaced apart will vary as design criteria dictates. The trenches 42a, 42b, and 42c extend circumferentially to adjacent the fillet 48 of each rotor blade 34a and 34b. In other embodiments, the trenches 42a, 42b, and 42c can be milled to extend into the fillet 48 and/or can extend to the leading edge 38 of the rim 30.

The trenches 42a, 42b, and 42c cause the working fluid channeled through the flow paths 50a, 50b, and 50c along the flow surface 36 to change direction. This change in the direction of the flow reduces thermally and load induced principle stresses and the hoop stress on the integrally bladed disk 24A. In particular, the trenches 42a, 42b, and 42c reduce stress concentrations at the rim 30 adjacent the leading edges 44 and the pressure side of the rotor blades 34a and 34b. By utilizing the trenches 42a, 42b, and 42c as opposed to a conventional integrally bladed disk, a hoop stress reduction of about 10% to 25% and a reduction in principle stresses of about 5% to 15% for the integrally bladed disk 24A can be achieved. This stress reduction increases the operation life cycle for the integrally bladed disk 24A by about 10× when compared to conventional integrally bladed disks without trenches 42a, 42b, and 42c.

Figure 3A:
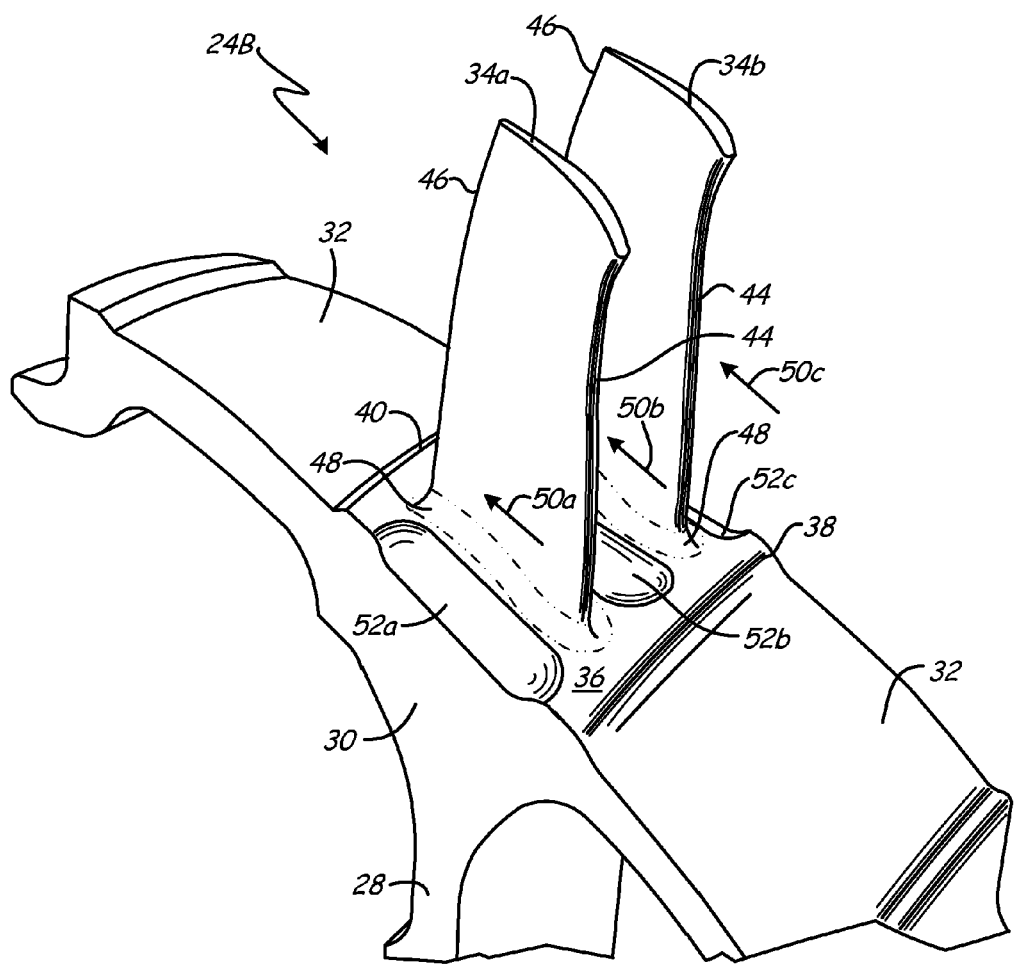
FIG. 3A is a perspective view of a circumferential section of another embodiment of an integrally bladed rotor disk having flow path trenches in the perimeter thereof.
Figure 3B:
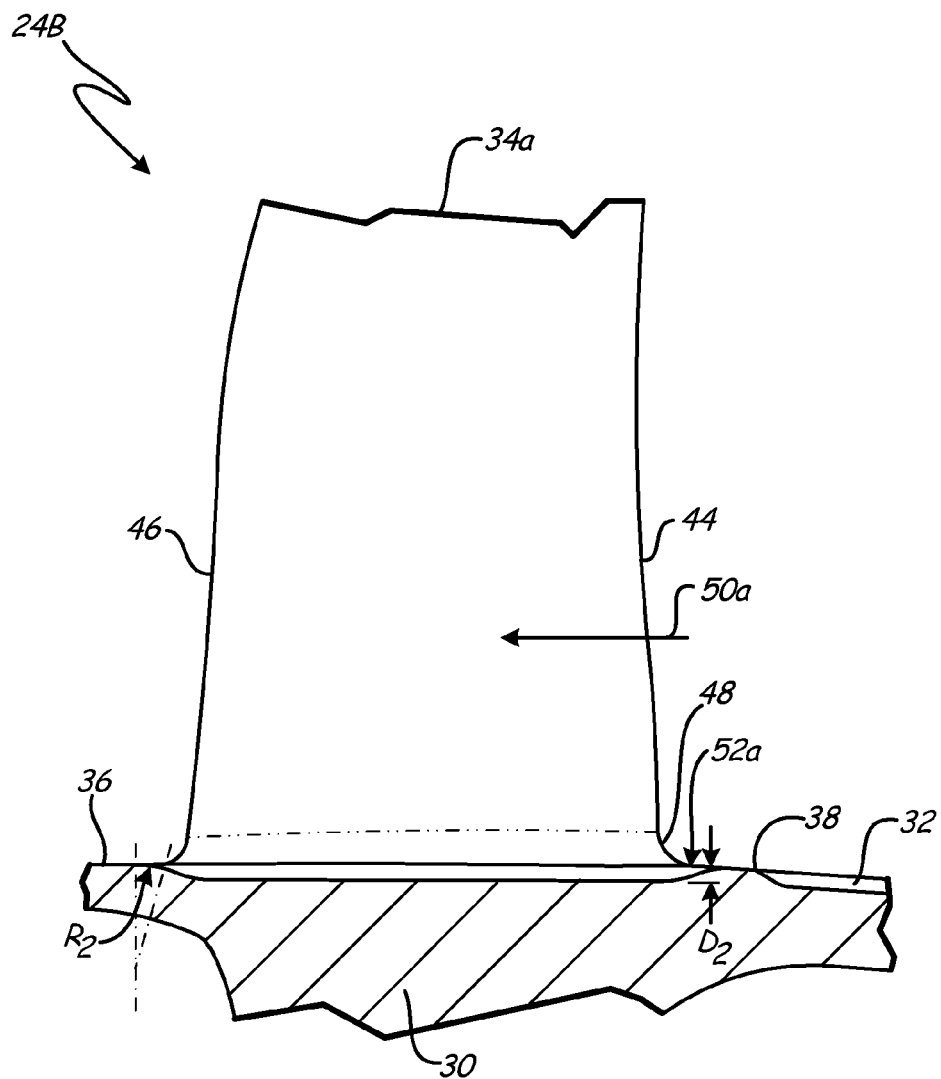
FIG. 3B is a radial sectional view of the integrally bladed rotor disk illustrated in FIG. 3A.
Figure 3C:
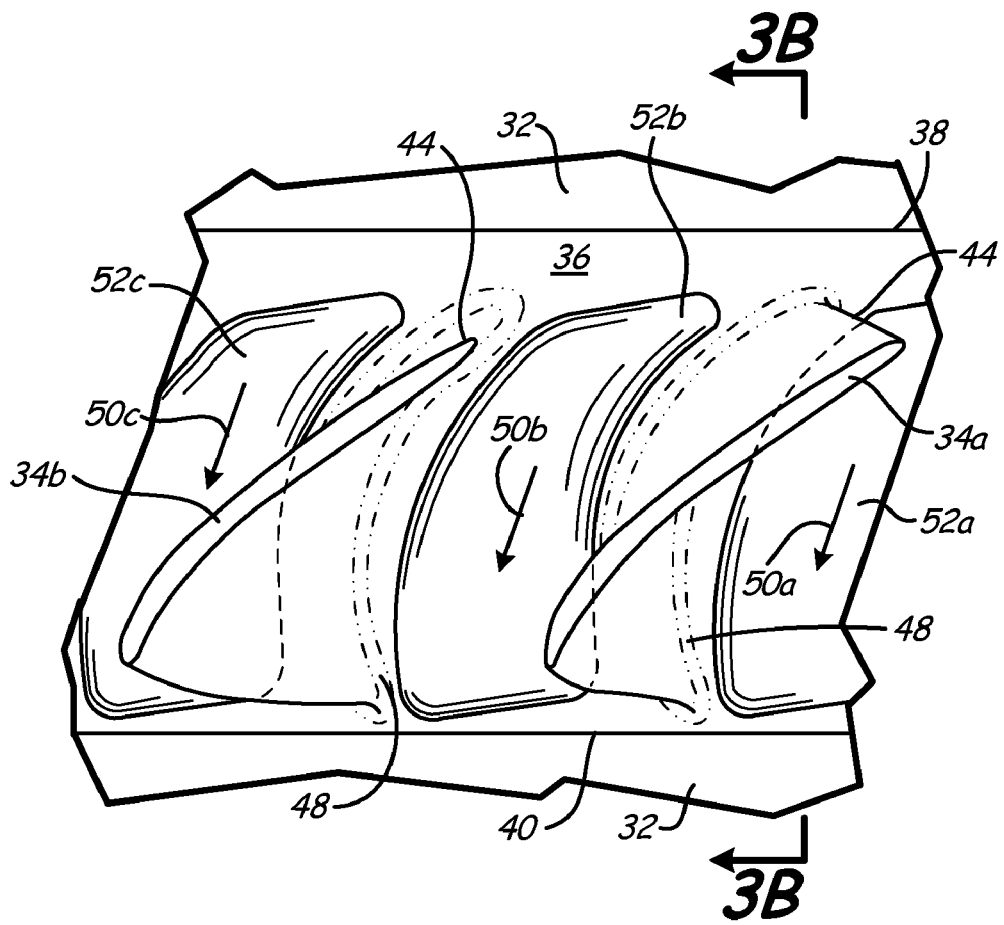
FIG. 3C is a top perspective view of the perimeter of the integrally bladed rotor disk illustrated in FIG. 3A.

FIGS. 3A-3C are views from various perspectives of a circumferential portion of another embodiment of an integrally bladed disk 24B. The integrally bladed disk 24B illustrated in FIGS. 3A-3C has similar features and operates in a manner similar to the integrally bladed disk 24A shown in FIGS. 2A-2C. However, the integrally bladed disk 24B includes trenches 52a, 52b, and 52c. The trenches 52a, 52b, and 52c are disposed circumferentially between each of the rotor blades in the row of rotor blades with the trench 52b disposed between the rotor blades 34a and 34b. The trenches 52a, 52b, and 52c are milled to extend adjacent each fillet 48 and extend axially forward and rearward (aft) of the leading edges 44 of the rotor blades 34a and 34b. In other embodiments, the trenches 52a, 52b, and 52c can extend into the fillets 48. In particular, the trenches 52a, 52b, and 52c extend axially to about the trailing edge 46 of the rotor blades 34a and 34b. The trenches 52a, 52b, and 52c can all have a substantially identical depth $D_2$ of between about 0.005 inch (0.127 mm) and 0.060 inch (1.52 mm) or, in other embodiments, each trench 52a, 52b, and 52c can have a depth $D_2$ that differs from the depth of the other trenches. The radius $R_2$ of the trench 52a and all the trenches can vary because, for example, the diameter of the head of the milling tool can be varied.

Figure 4A:
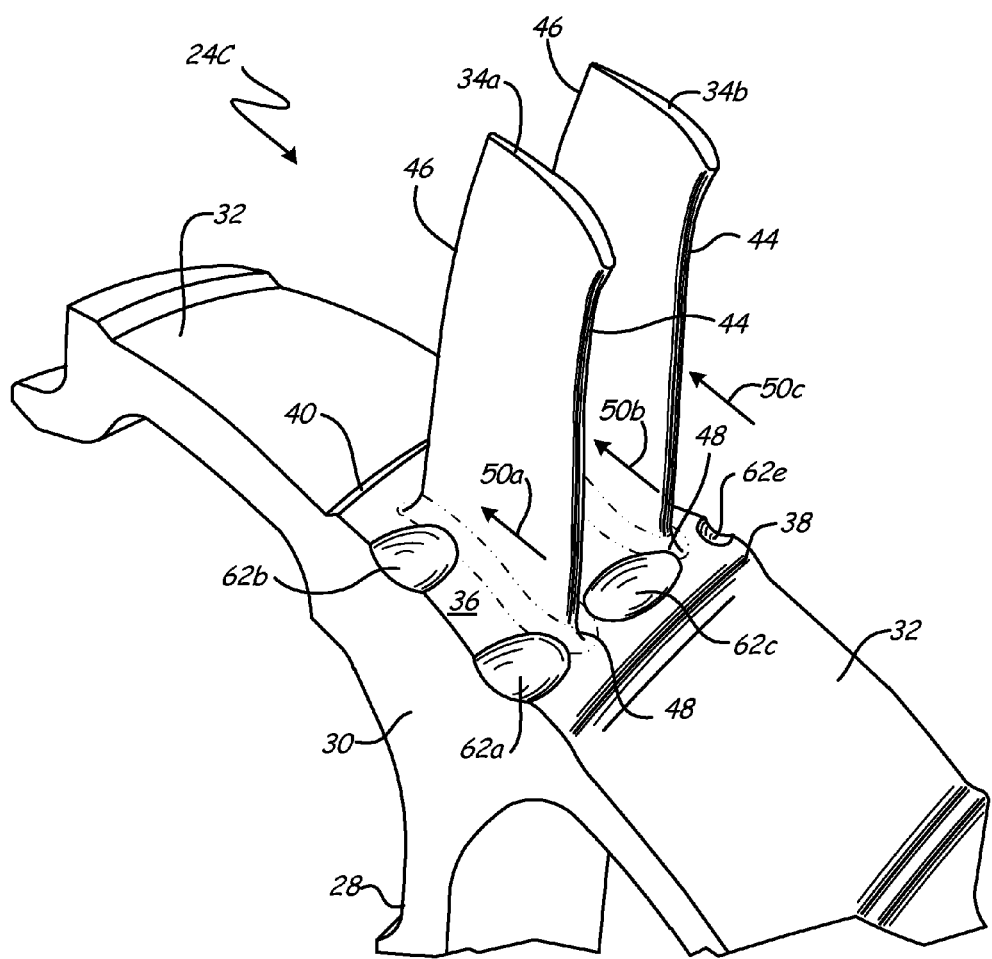
FIG. 4A is a perspective view of a circumferential section of yet another embodiment of an integrally bladed rotor disk having flow path trenches in the perimeter thereof.
Figure 4B:
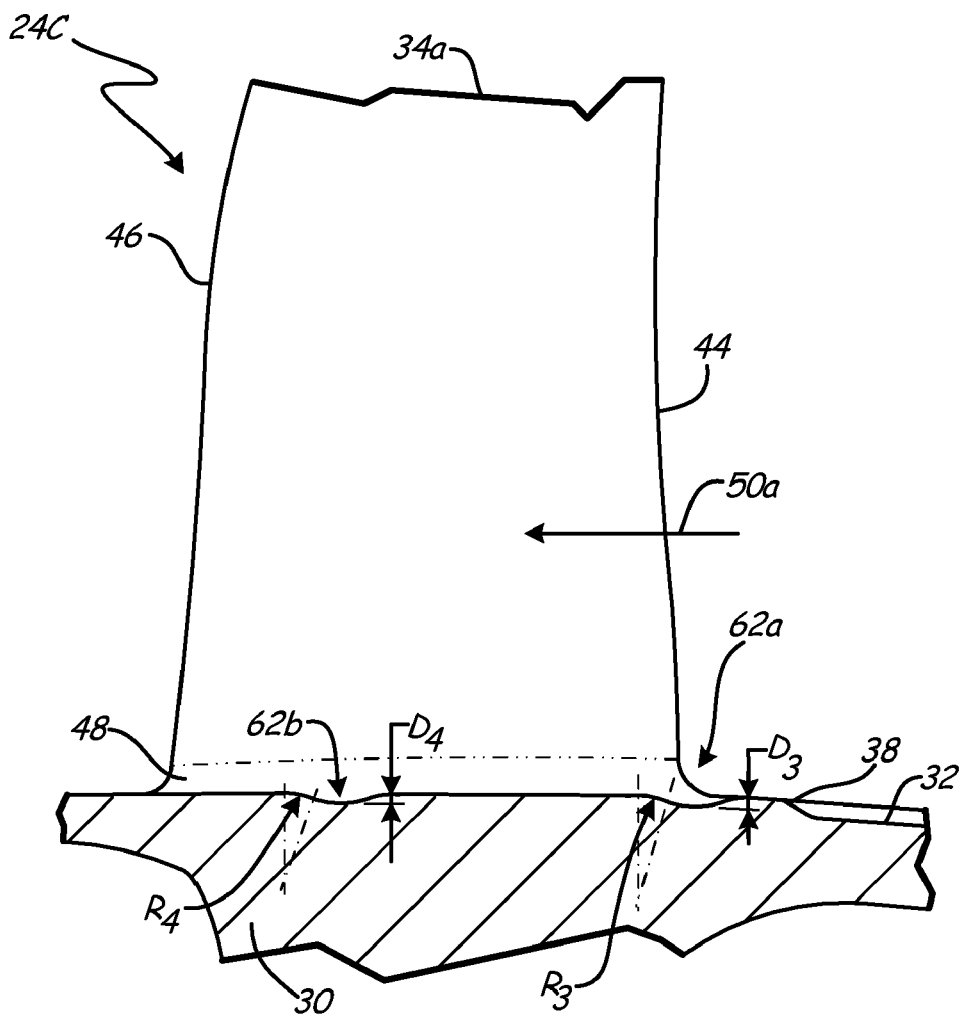
FIG. 4B is a radial sectional view of the integrally bladed rotor disk illustrated in FIG. 4A.
Figure 4C:
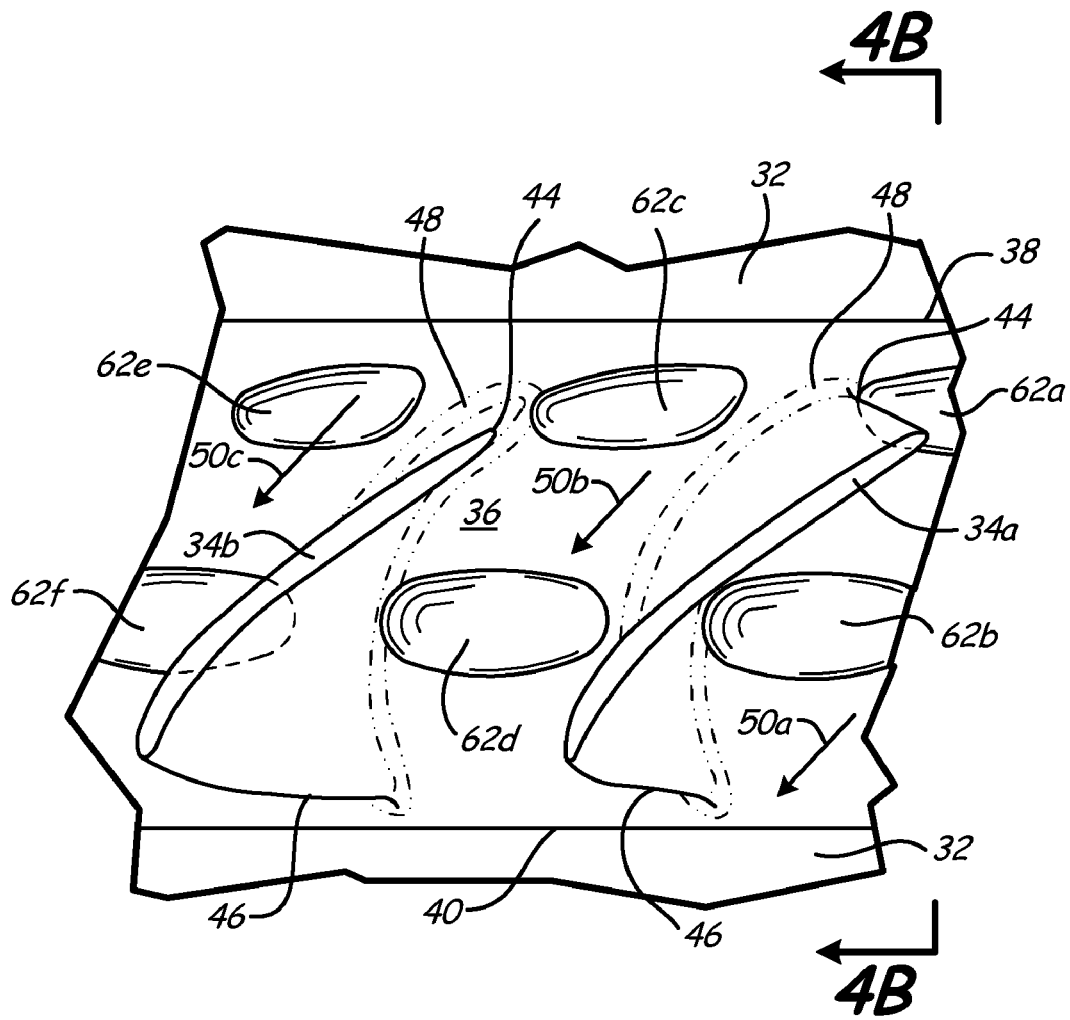
FIG. 4C is a top perspective view of the perimeter of the integrally bladed rotor disk illustrated in FIG. 4A.

FIGS. 4A-4C are views from various perspectives of a circumferential portion of another embodiment of an integrally bladed disk 24C. The integrally bladed disk 24C illustrated in FIGS. 4A-4C has similar features and operates in a manner similar to the integrally bladed disk 24A shown in FIGS. 2A-2C. However, the integrally bladed disk 24C includes trenches 62a, 62b, 62c, 62d, 62e, and 62f. The trenches 62a, 62b, 62c, 62d, 62e, and 62f are disposed circumferentially adjacent each of the rotor blades in the row of rotor blades with the trenches 62c and 62d disposed between the rotor blades 34a and 34b. Although not illustrated extending into the fillet 48 of each rotor blade 34a and 34b, in some embodiments the trenches 62a, 62b, 62c, 62d, 62e, and 62f can extend into the fillet 48. The trenches 62a, 62c and 62e are disposed adjacent the leading edges 44 of the rotor blades 34a and 34b and extend axially forward and rearward (aft) of the leading edges 44. As illustrated in FIGS. 4B and 4C, the deepest portion of trenches 62a, 62c and 62e are disposed to circumferentially align with a location of highest stress concentration (a life limiting location) at a leading edge of the fillet 48 of each rotor blade 34a and 34b. The trenches 62b, 62d, and 62f are disposed circumferentially adjacent the rotor blades 34a and 34b with trench 62d disposed between rotor blades 34a and 34b. The axial and circumferential location of the trenches 62a, 62b, 62c, 62d, 62e, and 62f relative the blades 34a and 34b and relative one another can be varied or staggered to optimally reduce stresses and increase the service cycle life of the integrally bladed disk 24C. Similarly, the geometric shape or number of the trenches can be varied or staggered relative to one another to optimally reduce stresses and increase the service cycle life of the integrally bladed disk. This optimization to design criteria can be achieved by commercially available finite element analysis and computational fluid dynamics software. The trenches 62a and 62b illustrated in FIG. 4B have depths $D_3$ and $D_4$ of between about 0.005 inch (0.127 mm) and 0.060 inch (1.52 mm). Depths $D_3$ and $D_4$ (and depths of all the trenches 62a, 62b, 62c, 62d, 62e, and 62f) can be substantially similar to one another or can differ from one another. The radii $R_2$ and $R_3$ of the trenches 62a and 62b (and all the trenches) on the integrally bladed disk 24C can vary because, for example, the diameter of the head of the milling tool can be varied.

Integrally bladed disks such as the ones illustrated in the FIGURES can be manufactured by milling, forging, casting or other known manufacturing operations. If a milling process is used to manufacture the integrally bladed disk, the trenches can be milled along with the milling of flow paths 50a, 50b and 50c to save time and reduce or eliminate the need for additional processes to create the trenches.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An integrally bladed disk, comprising:
    a rotor disk having a rim the periphery of which forms a flow surface; and
    circumferentially spaced blades extending integrally outward from the rim to define a flow path therebetween, wherein a base of each of the blades has a fillet;
    wherein the rim includes a plurality of trenches that are disposed adjacent and between the blades along the flow surface, wherein a deepest point of one of the trenches circumferentially aligns with a location of highest stress concentration at a leading edge of the fillet.

2. The integrally bladed disk of claim 1, wherein the trench extends axially forward and rearward of a leading edge of the blades.

3. The integrally bladed disk of claim 1, wherein the trench extends axially to a trailing edge of the blades.

4. The integrally bladed disk of claim 1, wherein the trench has a depth of between 0.005 inch (0.127 mm) and 0.060 inch (1.52 mm).

5. The integrally bladed disk of claim 1, wherein the trench extends into at least one fillet.

6. The integrally bladed disk of claim 1, wherein the blades have at least one trench disposed therebetween.

7. The integrally bladed disk of claim 1, wherein the trench has a radius with a smooth transition from the deepest point of the trench to a radius of one of the fillet or the flow surface.

8. A gas turbine engine having a stress relief feature, the engine comprising:
    an integral rotary body having a plurality of blades extending from a peripheral rim thereof, the peripheral rim having a plurality of depressions that are disposed adjacent and between the plurality of blades, wherein a base of the blade has a fillet and a deepest point of one of the depressions circumferentially aligns with a location of highest stress concentration at a leading edge of the fillet, and wherein the one depression extends into the fillet in at least one location along the base of the blade.

9. The gas turbine engine of claim 8, wherein the depression extends axially forward and rearward of a leading edge of the blade.

10. The gas turbine engine of claim 8, wherein the depression extends axially to a trailing edge of the blade.

11. The gas turbine engine of claim 8, wherein the depression has a depth of between 0.005 inch (0.127 mm) and 0.060 inch (1.52 mm).

12. The gas turbine engine of claim 8, wherein the blade comprises a plurality of blades and at least one depression is disposed between the blades.

13. The gas turbine engine of claim 8, wherein the depression has a radius with a smooth transition from the deepest point of the trench to a radius of the fillet.

14. A stress relief feature for an integral rotary body having a plurality of blades extending from a peripheral rim, the feature comprising:
    a plurality of depressions are disposed in the peripheral rim of the integral rotary body between the plurality of blades, a deepest portion of one of the depressions is circumferentially aligned with a location of highest stress concentration at a leading edge of a fillet of the blade.

15. The stress relief feature of claim 14, wherein the depression is disposed between two blades and extends axially forward and rearward of a leading edge of the two blades.

16. The stress relief feature of claim 14, wherein the depression has a depth of between 0.005 inch (0.127 mm) and 0.060 inch (1.52 mm).

17. The stress relief feature of claim 14, wherein the depression extends into the fillet.

18. The stress relief feature of claim 14, wherein the depression has a radius with a smooth transition from the deepest point of the trench to a radius of one of the fillet or a flow surface of the peripheral rim.

* * * * *

UNITED STATES PATENT AND TRADEMARK OFFICE
CERTIFICATE OF CORRECTION

Page 1 of 1

PATENT NO. : 8,403,645 B2
APPLICATION NO. : 12/560710
DATED : March 26, 2013
INVENTOR(S) : Roland R. Barnes et al.

It is certified that error appears in the above-identified patent and that said Letters Patent is hereby corrected as shown below:

In the Specification

Col. 5, Line 5
  Delete "620"
  Insert --62f--

Signed and Sealed this
Twenty-fourth Day of December, 2013

Margaret A. Focarino
*Commissioner for Patents of the United States Patent and Trademark Office*